US009860705B2

(12) United States Patent
Persson et al.

(10) Patent No.: US 9,860,705 B2
(45) Date of Patent: Jan. 2, 2018

(54) FINGERPRINT MATCHING IN MASSIVE MIMO SYSTEMS

(71) Applicant: Sony Corporation, Tokyo (JP)

(72) Inventors: Magnus Persson, Lund (SE); Erik Bengtsson, Eslöv (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 22 days.

(21) Appl. No.: 14/804,575

(22) Filed: Jul. 21, 2015

(65) Prior Publication Data
US 2016/0277899 A1 Sep. 22, 2016

Related U.S. Application Data

(63) Continuation of application No. PCT/EP2015/055706, filed on Mar. 18, 2015.

(51) Int. Cl.
*H04W 4/02* (2009.01)
*H04W 64/00* (2009.01)
(Continued)

(52) U.S. Cl.
CPC .......... *H04W 4/028* (2013.01); *H04B 7/0413* (2013.01); *H04L 5/0048* (2013.01);
(Continued)

(58) Field of Classification Search
CPC ... H04W 64/00; H04W 64/006; H04W 4/028; H04W 4/025; H04W 24/10; H04B 7/0413; G01S 5/0252; G01S 5/0273
See application file for complete search history.

(56) References Cited

U.S. PATENT DOCUMENTS

| 6,456,956 B1 * | 9/2002 | Xiong ...................... G01S 3/06 702/115 |
| 2003/0003924 A1 * | 1/2003 | Lin ........................ H04W 64/00 455/456.1 |

(Continued)

FOREIGN PATENT DOCUMENTS

WO 2010069610 A1 6/2010

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)", 3GPP Standard; 3GPP TS 36.305, 3rd Generation Partnership Project (3GPP), Mobile Competence Centre ; 650, Route Des Lucioles ; F-06921 Sophia-Antipolis Cedex ; France, vol. RAN WG2, No. V11.1.0, Sep. 21, 2012, pp. 1-58, XP050649828, [retrieved on Sep. 21, 2012].

(Continued)

*Primary Examiner* — Daniel Lai
(74) *Attorney, Agent, or Firm* — James C. Edwards; Moore & Van Allen PLLC (57) ABSTRACT

The invention is directed to systems, methods and computer program products for determining a location of a device on a massive MIMO (multiple-input multiple-output) network. An exemplary method comprises receiving, from a device, a first signal and a second signal at a base station; measuring a first signal characteristic for the first signal and a second signal characteristic for the second signal; comparing and matching the first measured signal characteristic to a first reference signal characteristic for a first reference signal and the second measured signal characteristic to a second reference signal characteristic for a second reference signal; and determining a location of the device based on the first (Continued)

measured signal characteristic and the second measured signal characteristic.

19 Claims, 4 Drawing Sheets

(51) Int. Cl.
*H04B 7/0413* (2017.01)
*H04L 5/00* (2006.01)
*H04W 24/10* (2009.01)
*G01S 5/02* (2010.01)

(52) U.S. Cl.
CPC .......... *H04W 24/10* (2013.01); *H04W 64/00* (2013.01); *H04W 64/006* (2013.01); *G01S 5/0252* (2013.01); *G01S 5/0273* (2013.01)

(56) References Cited

U.S. PATENT DOCUMENTS

| | | | | |
|---|---|---|---|---|
| 2004/0109475 | A1* | 6/2004 | Elam | G01S 5/14 370/508 |
| 2005/0281363 | A1* | 12/2005 | Qi | H04W 64/00 375/349 |
| 2008/0026733 | A1* | 1/2008 | Jaatinen | G01S 5/02 455/414.2 |
| 2010/0309051 | A1* | 12/2010 | Moshfeghi | G01S 5/0236 342/378 |
| 2012/0052835 | A1 | 3/2012 | Bull et al. | |
| 2012/0319903 | A1* | 12/2012 | Huseth | G01S 5/28 342/386 |
| 2013/0072230 | A1* | 3/2013 | Bansal | H04W 4/02 455/456.2 |
| 2013/0154872 | A1* | 6/2013 | Siaud | G01S 13/003 342/125 |
| 2013/0172007 | A1 | 7/2013 | Wax et al. | |
| 2014/0302870 | A1* | 10/2014 | Cui | H04W 64/00 455/456.1 |
| 2016/0241364 | A1* | 8/2016 | Shen | H04L 5/0007 |
| 2017/0090025 | A1* | 3/2017 | Wang | G01S 13/46 |

OTHER PUBLICATIONS

International Search Report and Written Opinion; Oct. 29, 2015; issued in International Patent Application No. PCT/EP2015/055706.

* cited by examiner

FINGERPRINT MATCHING IN MASSIVE MIMO SYSTEMS

BACKGROUND

In today's cellular or connectivity systems, a user equipment (UE) is capable of measuring signals (e.g., radio frequency (RF) signals) from multiple base stations (BSs) or access points (APs) and based on the relative phases of the measured signals, calculate the UE's position by means of triangulation. In a massive MIMO system, this will not be possible for two reasons. A UE will not be able to listen to a BS to which it is not connected and the phase of a signal is re-defined for every frame; hence there is no absolute phase. Therefore, the UE is not capable of determining its position based on the RF signal.

BRIEF SUMMARY

Embodiments of the invention are directed to systems, methods and computer program products for determining a location of a device. A method for determining a location of a device comprises receiving, from a device, a first signal and a second signal at a base station; measuring a first signal characteristic for the first signal and a second signal characteristic for the second signal; comparing and matching the first measured signal characteristic to a first reference signal characteristic for a first reference signal and the second measured signal characteristic to a second reference signal characteristic for a second reference signal; and determining a location of the device based on the first measured signal characteristic and the second measured signal characteristic.

In some embodiments, the first signal characteristic or the second signal characteristic comprises a horizontal incoming angle.

In some embodiments, the first signal characteristic or the second signal characteristic comprises a vertical incoming angle.

In some embodiments, the first signal characteristic or the second signal characteristic comprises a time delay, an angular spread, or an amplitude.

In some embodiments, the first signal or the second signal comprises an echo of a pilot signal.

In some embodiments, the first signal or the second signal comprises a multipath component (MPC).

In some embodiments, the first signal and the second signal comprise a subset of MPCs selected based on a criteria (e.g., amplitude).

In some embodiments, the first reference signal characteristic or the second reference signal characteristic is stored in a reference table.

In some embodiments, the location of the device is determined once per unit interval.

In some embodiments, the location of the device is determined once per data frame transmitted from the device to the base station.

In some embodiments, the device is located in a closed area (e.g., an area surrounded by at least one of sidewalls, a roof, and a floor).

In some embodiments, the device is located in an open area (e.g., an area exposed to the atmosphere).

In some embodiments, the method further comprises determining a location history of the device, and determining the location of the device further based on the location history.

In some embodiments, the method further comprises determining a time of the day, and determining the location of the device further based on the location history and the time of the day.

In some embodiments, the method further comprises determining a speed of the device, and determining the location of the device further based on the speed.

In some embodiments, an apparatus (e.g., located at a base station) is provided for determining a location of a device. The apparatus comprises: a memory; a processor; and a module stored in the memory, executable by the processor, and configured to: receive, from a device, a first signal and a second signal at a base station; measure a first signal characteristic for the first signal and a second signal characteristic for the second signal; compare and match the first measured signal characteristic to a first reference signal characteristic for a first reference signal and the second measured signal characteristic to a second reference signal characteristic for a second reference signal; determine a location of the device based on the first measured signal characteristic and the second measured signal characteristic.

In some embodiments, a computer program product is provided for determining a location of a device. The computer program product comprises a non-transitory computer-readable medium comprising a set of codes for causing a computer to receive, from a device, a first signal and a second signal at a base station; measure a first signal characteristic for the first signal and a second signal characteristic for the second signal; compare and match the first measured signal characteristic to a first reference signal characteristic for a first reference signal and the second measured signal characteristic to a second reference signal characteristic for a second reference signal; determine a location of the device based on the first measured signal characteristic and the second measured signal characteristic.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Massive MIMO systems are a popular candidate for future 3GPP (3$^{rd}$ Generation Partnership Project) releases. "Massive" MIMO refers to using multiple antennas (e.g., equal to or greater than a threshold number of antennas) in a MIMO system. An order associated with a MIMO system refers to a number of antennas associated with the MIMO system. The MIMO system includes at least one user equipment ("UE") and at least one base station ("BS"). As used herein, a UE may also be referred to as a device, system, mobile device, apparatus, etc.

In the present invention, a UE transmits a pilot signal either omnidirectionally or with some directivity. The pilot signal comprises multiple multi-path components (MPCs). Depending on the environment in which the pilot signal is transmitted (obstacles, walls, etc.), some MPCs reach the BS. The MPCs are evaluated by the BS in terms of delay, angular spread (AS), and angle of arrival (AoA). The amplitude of the MPCs may also be evaluated; however, information associated with the amplitude may not be useful as the user may load the antenna (e.g., by covering at least a part of the antenna with the user's hand). These evaluations together comprise a profile of an MPC. For each spatial coordinate position, the profile of an MPC is unique (the "fingerprint"), and the BS compares the measured profile to a pre-programmed profile stored on a storage device accessible by the BS. The BS may select a number of MPCs such as the most dominant MPCs (e.g., the MPCs associated with a certain time window) for the comparison in order to reduce the computational load. In some embodiments, rather than the most dominant MPCs, the BS may decide to use a selective number of MPCs for the comparison. In some embodiments, even the pre-programmed list includes MPCs that are the most dominant or a selected number of MPCs.

Figure 1:
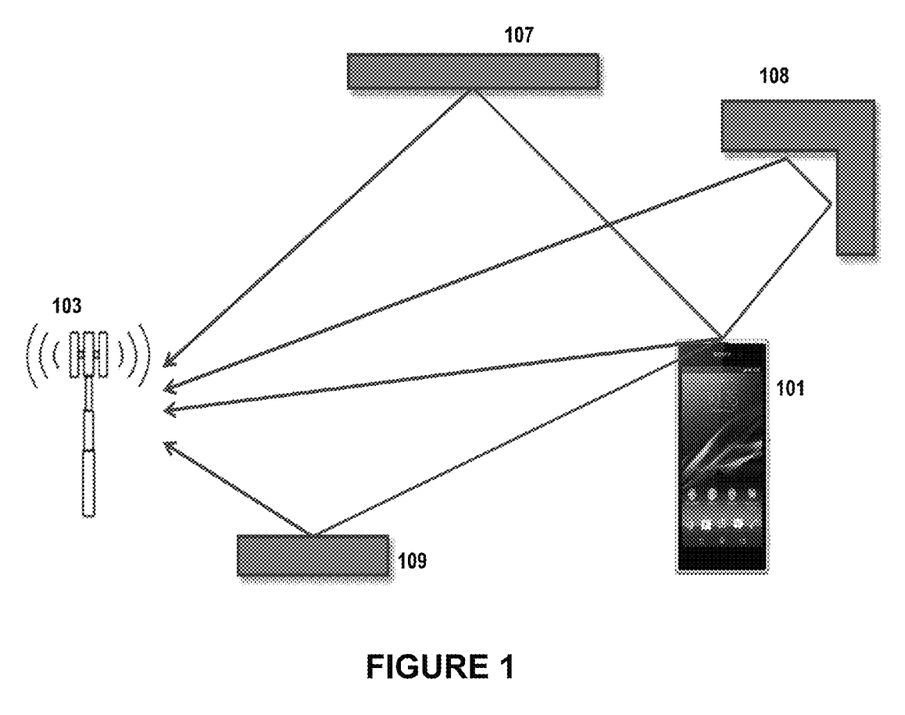
FIG. 1 is an exemplary MIMO network, in accordance with embodiments of the present invention.

When moving to a massive MIMO network, it is difficult to determine the location of a device. Referring now to FIG. 1, FIG. 1 presents an exemplary massive MIMO network. In massive MIMO, the device 101 sends out a pilot (or pilot signal) approximately every millisecond that is received at the base station 103. In some instances, the pilot signals transmitted from the device 101 may reflect off of a reflector 107, 108, or 109 prior to being received at the base station 103. At the base station 103, the angles of the incoming pilot signals are identified and the time delay for each pilot signal is calculated. As used herein, a pilot signal may also be referred to as just a signal or a signal path.

Figure 2:
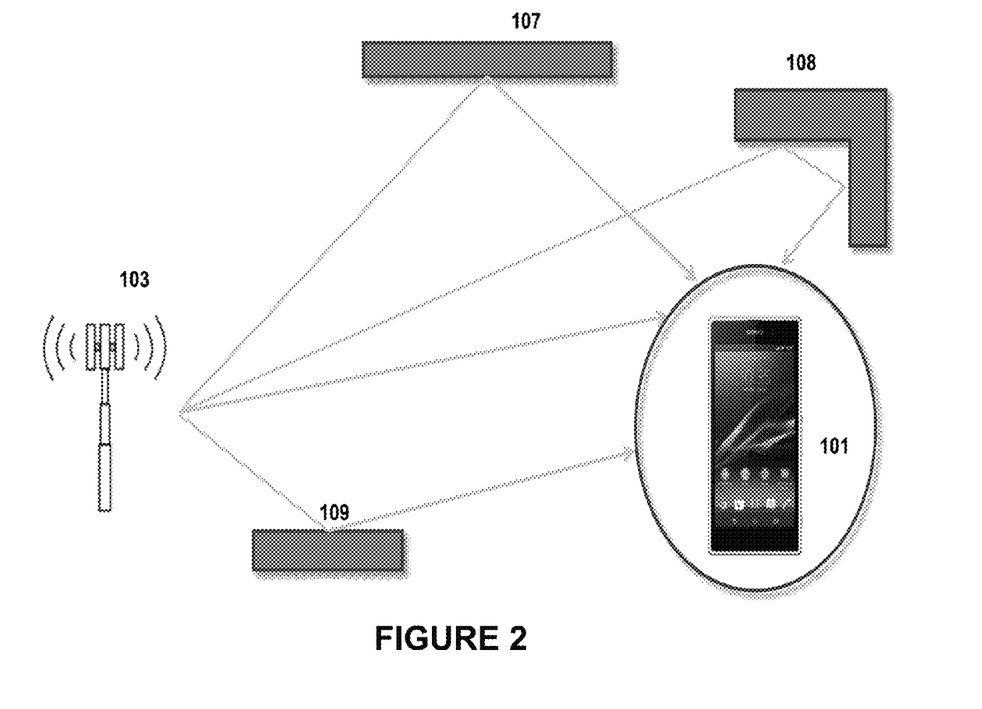
FIG. 2 is an exemplary MIMO network, in accordance with embodiments of the present invention.

Referring now to FIG. 2, FIG. 2 presents another exemplary massive MIMO network. The base station 103 that receives the signals in FIG. 1, transmits signals back in substantially the same directions with suitable time delays making the signals reach the device at substantially the same time from multiple paths. Hence, no phase difference between the signals can be identified when the device is moving as the base station compensates for any possible phase difference between the signals. The signal strength of a signal can also vary heavily based on the available reflections and is no longer as tightly related to the distance from the base station and the output power of the device such that the signal strength can be used for estimating the location of a device (e.g., the distance from the base station to the device). What is needed is a novel method to find the location of the device. The present invention provides a novel method of determining the location of the device. The method works where the device is indoors (e.g., a closed environment not exposed to the outside such as inside a building), or outdoors (e.g., an open environment such as out on a field). The device location method also enables the device to comply with potential future emergency call requirements (i.e., the ability to accurately position a device during an emergency call when required).

Fingerprinting is used for positioning a device and typically based on radio characteristics (such as signal strength, time delay, relative phase etc.) experienced by the device from different BS or APs. Fingerprinting then maps these measurements of radio signals versus references measurements at known locations (e.g., in a building). Fingerprinting may also involve simulating measurements using geospatial information. However, these methods of fingerprinting will be less accurate when a signal is blocked (e.g., by a head or hand of the device user), or when signal measurements are received from or at a single base station. In Massive MIMO, these methods do not work as the phase of the BS signal is redefined for each frame and also the UE is capable of receiving signals from only the BS to which it is connected. A UE may also receive signals from multiple transmitters if additional resources are available to the UE to have a link setup for listening to multiple transmitters. However, as described herein, some signal characteristics (e.g., differences in signal characteristics of two or more signals) in massive MIMO enable high resolution positioning of the device. The procedures (e.g., measuring, comparing, storing, etc.) associated with the various signal measurements or characteristics described herein may be referred to as fingerprinting a device.

In some embodiments, the base station looks at the time delay (e.g., delay of one signal with respect to another signal or a base signal) and incoming angles of the various pilot signals that are transmitted from the device (MPCs) in order to identify the location of the device. A device transmits its pilot signal and the pilot signal is received at the base station. The base station creates a table of incoming angles, AS and time delays (perhaps also relative levels) of various MPCs seen by the base station. The base station compares the created table with a reference table comprising reference measurements of incoming angles, AS and time delays of various signals (perhaps relative levels). A signal characteristic of the measured signal is compared to a signal characteristic of the reference signal until a match is found, i.e., until at least significant number signals are found that have substantially similar signal characteristics (for at least two signal characteristics). As an example, a signal may be blocked by the user's hand or head or other obstacle on the path between the device and the base station, and therefore, a reference signal will not be matched with this blocked signal since the blocked signal does not reach the base station. Such blocked signals are not used in determining the location (or positioning) of the device. As used herein, the location of the device is the physical location of the device. If match is found between measured signal characteristics and reference signal characteristics for a pre determined number of signals, this information can be used to determine the location of the device.

In some embodiments, the incoming angle comprises a horizontal angle with respect to a horizontal reference axis and vertical angle with respect to a vertical reference axis. This separation of angles makes each signal more unique and thus easier to find a match in the reference table. The types of signal characteristics (both measured and reference characteristics) are not limited to the signal characteristics described herein.

In some embodiments, several steps can be pursued to reduce the complexity and computational load (e.g., for at least one of the device or the base station). The location of the device can be determined once per time interval (e.g., one second) instead of for every data frame (e.g., transmitted from the device to the base station). In some embodiments, the horizontal incoming angle is measured and the vertical incoming angle is not measured; therefore, fewer signal characteristics are measured and compared. This may be enough for situations where the device is located indoors or accuracy in elevation may not be needed. In alternate embodiments, the vertical incoming angle is measured and the horizontal incoming angle is not measured. In some embodiments, the location determining or positioning procedure described herein can be combined with other information such as the history of device location (e.g., over a period of time, at a particular during the day, etc.) to determine the likelihood of the device being in a particular location. The speed at which the device is moving may also be determined (e.g., by the base station or by the device and transmitted to the base station) and may be used as an additional factor in determining the location of the device.

Figure 3:
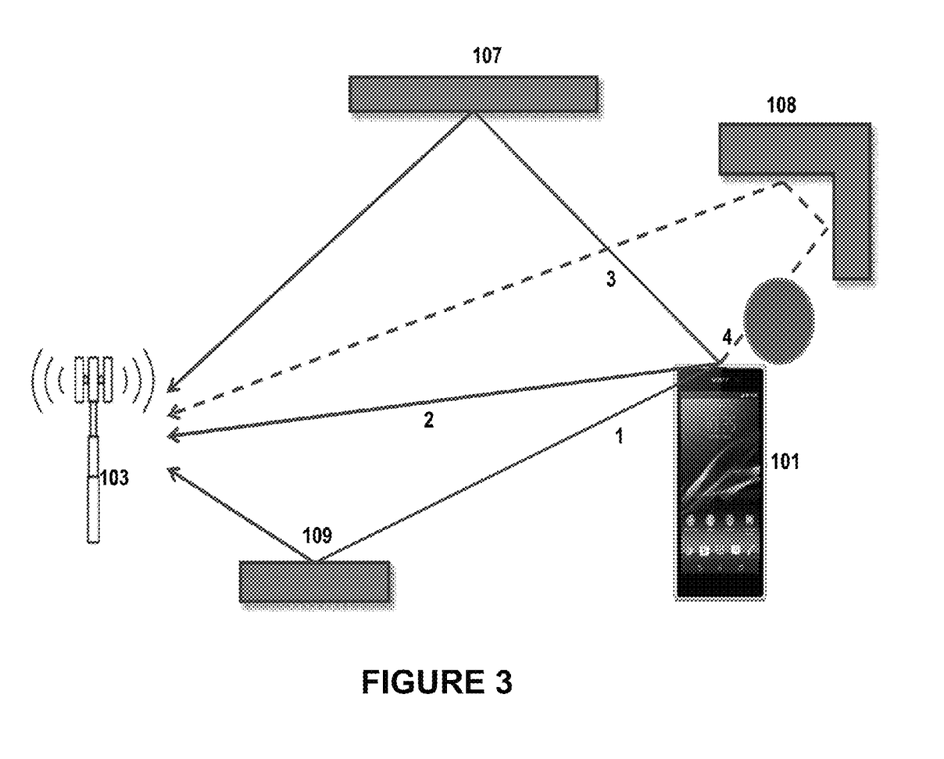
FIG. 3 is an exemplary MIMO network, in accordance with embodiments of the present invention.

Referring now to FIG. 3, FIG. 3 presents another massive MIMO network environment. Signals 1, 2, 3, and 4 are transmitted from the device 101 to the base station 103. Signal 4 is blocked by an obstacle and does not reach the base station 103. Therefore, any reference signal in the base station's reference table will not be matched up with signal 4 since signal 4 does not reach the base station 103. The base station 103 compares measured signal characteristics (e.g., incoming angle and time delay) of signals 1, 2, and 3 to reference signals in the base station's reference table to determine matches for signals 1, 2, and 3. When the measured signals are matched up with reference signals, the signal characteristics (for the measured and/or reference signals) can be used to determine the location of the device 101. The signal characteristics can include any one of horizontal angle, vertical angle, angular spread, time delay with respect to a base signal, and amplitude (e.g., relative signal strength index RSSI).

Figure 4:
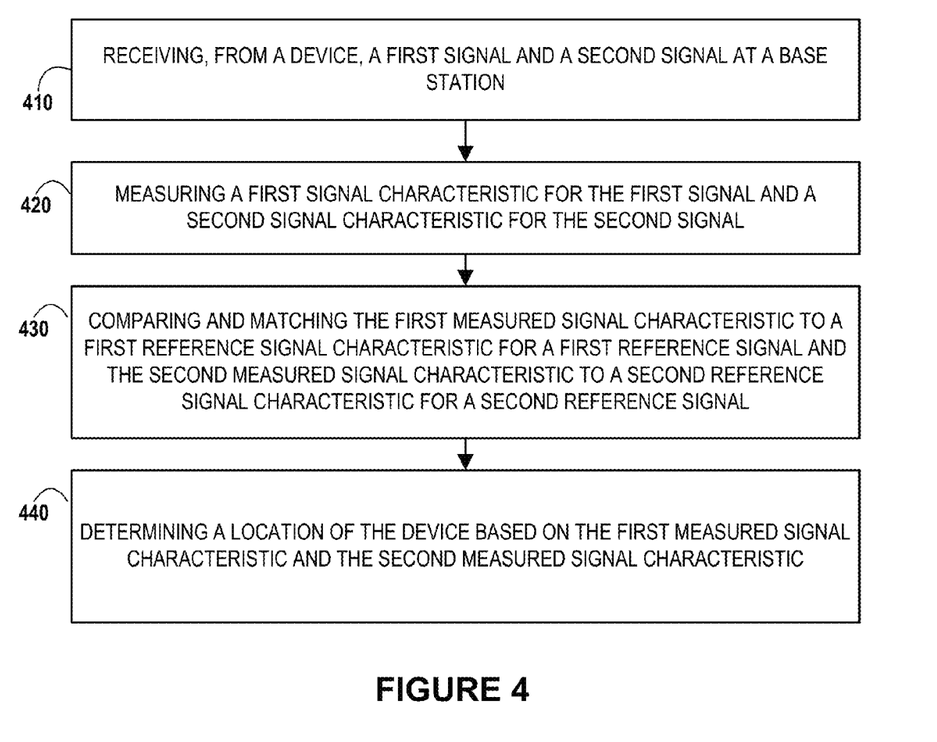
FIG. 4 is an exemplary method for determining the location of the device, in accordance with embodiments of the present invention.

Referring now to FIG. 4, FIG. 4 presents an exemplary method according to embodiments of the invention. At block 410, the method comprises receiving, from a device, a first signal and a second signal at a base station. At block 420, the method comprises measuring a first signal characteristic for the first signal and a second signal characteristic for the second signal. At block 430, the method comprises comparing and matching the first measured signal characteristic to a first reference signal characteristic for a first reference signal and the second measured signal characteristic to a second reference signal characteristic for a second reference signal. At block 440, the method comprises determining a location of the device based on the first measured signal characteristic and the second measured signal characteristic.

In some embodiments, the first signal characteristic or the second signal characteristic comprises a horizontal incoming angle, a vertical incoming angle, a time delay, or an amplitude. In some embodiments, the first signal or the second signal comprise echoes of the same pilot signal or an MPC associated with a pilot signal. In some embodiments, the first signal and the second signal comprise a subset of MPCs selected based on a criteria (e.g., amplitude). In some embodiments, the first reference signal characteristic or the second reference signal characteristic is stored in a reference table. In some embodiments, a third signal transmitted from the device is blocked by an obstacle and not received at the base station, wherein a signal characteristic of the blocked third signal is not used in determining the location of the device.

In some embodiments, the location of the device is determined once per unit interval. In some embodiments, the location of the device is determined once per data frame transmitted from the device to the base station. In some embodiments, the device is located in a closed area. In some embodiments, the device is located in an open area.

In some embodiments, the method further comprises determining a location history of the device (e.g., over a predetermined duration of time), and determining the location of the device further based on the location history. Therefore, if the location of the device as determined by the measured signal characteristics matches the location determined by the location history and/or the time of day and/or the speed of the device, the base station can determine the location of the device with a degree of confidence equal to or greater than a certain threshold. If the location of the device as determined by the measured signal characteristics matches the location determined by the location history and/or the time of day and/or the speed of the device, the base station can determine the location of the device with a degree of confidence lower than the certain threshold.

The invention is not limited to any particular types of devices for the device 101 or the base station 103. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each device and/or base station comprises a communication interface, a processor, a memory, and a module stored in the memory, executable by the processor, and configured to perform the various processes described herein. Each communication interface described herein enables communication with other systems. For example, the communication interface comprises at least one antenna.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory ("RAM"), a read-only memory ("ROM"), an erasable programmable read-only memory ("EPROM" or "Flash memory"), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining a location of a device on a massive MIMO (multiple-input multiple-output) network, the method comprising:
   receiving, from the device, a first signal and a second signal at a base station, wherein the signals are received via the massive MIMO network;
   measuring a first signal characteristic for the first signal and a second signal characteristic for the second signal, wherein the first signal characteristic and the second signal characteristic comprise at least angular spread;

comparing the first and second measured signal characteristics to a plurality of reference signal characteristics, each reference signal characteristic associated with a corresponding reference signal;
based on the results of the comparison, matching at least the angular spread of the first measured signal characteristic to a first reference signal characteristic for a first reference signal and at least the angular spread of the second measured signal characteristic to a second reference signal characteristic for a second reference signal; and
in response to matching at least the angular spread of the first measured signal characteristic to the first reference signal characteristic for the first reference signal and the angular spread of the second measured signal characteristic to the second reference signal characteristic for the second reference signal, determining a location of the device based on the first measured signal characteristic and the second measured signal characteristic.

2. The method of claim 1, wherein the first signal characteristic or the second signal characteristic comprises a horizontal incoming angle.

3. The method of claim 1, wherein the first signal characteristic or the second signal characteristic comprises a vertical incoming angle.

4. The method of claim 1, wherein the first signal characteristic or the second signal characteristic comprises a time delay, or an amplitude.

5. The method of claim 1, wherein the first signal or the second signal comprises an echo of a pilot signal.

6. The method of claim 1, wherein the first signal or the second signal comprises a multipath component (MPC).

7. The method of claim 1, wherein the first signal or the second signal comprises a subset of multipath components (MPCs) selected based on a criteria.

8. The method of claim 1, wherein the first reference signal characteristic or the second reference signal characteristic is stored in a reference table.

9. The method of claim 1, wherein the location of the device is determined once per unit interval.

10. The method of claim 1, further comprising determining a location history of the device, and determining the location of the device further based on the location history.

11. The method of claim 10, further comprising determining a time of the day, and determining the location of the device further based on the location history and the time of the day.

12. The method of claim 1, further comprising determining a speed of the device, and determining the location of the device further based on the speed.

13. The method of claim 1, further comprising transmitting the location of the device to the device.

14. An apparatus for determining a location of a device on a massive MIMO (multiple-input multiple-output) network, the apparatus comprising:
a memory;
a processor; and
a module stored in the memory, executable by the processor, and configured to:
receive, from the device, a first signal and a second signal at a base station, wherein the signals are received via the massive MIMO network;
measure a first signal characteristic for the first signal and a second signal characteristic for the second signal, wherein the first signal characteristic and the second signal characteristic comprise at least angular spread;
compare the first and second measured signal characteristics including the to a plurality of reference signal characteristics, each reference signal characteristic associated with a corresponding reference signal;
based on the results of the comparison, match at least the angular spread of the first measured signal characteristic to a first reference signal characteristic for a first reference signal and at least the angular spread of the second measured signal characteristic to a second reference signal characteristic for a second reference signal; and
in response to matching at least the angular spread of the first measured signal characteristic to the first reference signal characteristic for the first reference signal and the angular spread of the second measured signal characteristic to the second reference signal characteristic for the second reference signal, determine a location of the device based on the first measured signal characteristic and the second measured signal characteristic.

15. The apparatus of claim 14, wherein the first signal characteristic or the second signal characteristic comprises a horizontal incoming angle.

16. The apparatus of claim 14, wherein the first signal characteristic or the second signal characteristic comprises a vertical incoming angle.

17. The apparatus of claim 14, wherein the first signal characteristic or the second signal characteristic comprises a time delay or an amplitude.

18. A computer program product for determining a location of a device on a massive MIMO (multiple-input multiple-output) network, the computer program product comprising:
a non-transitory computer-readable medium comprising a set of codes for causing a computer to:
receive, from the device, a first signal and a second signal at a base station, wherein the signals are received via the massive MIMO network;
measure a first signal characteristic for the first signal and a second signal characteristic for the second signal, wherein the first signal characteristic and the second signal characteristic comprises at least angular spread;
compare the first and second measured signal characteristics to a plurality of reference signal characteristics, each reference signal characteristic associated with a corresponding reference signal;
based on the results of the comparison, match at least the angular spread of the first measured signal characteristic to a first reference signal characteristic for a first reference signal and the angular spread of the second measured signal characteristic to a second reference signal characteristic for a second reference signal; and
in response to matching at least the angular spread of the first measured signal characteristic to the first reference signal characteristic for the first reference signal and the angular spread of the second measured signal characteristic to the second reference signal characteristic for the second reference signal, determine a location of the device based on the first measured signal characteristic and the second measured signal characteristic.

19. The computer program product of claim 18, wherein the first signal characteristic comprises a horizontal incoming angle, a vertical incoming angle, an angular spread, and/or a time delay.

\* \* \* \* \*